(12) United States Patent
Murphy et al.

(10) Patent No.: US 8,915,162 B2
(45) Date of Patent: Dec. 23, 2014

(54) COMPLIANT GEAR ASSEMBLY HAVING VARIABLE SPRING FORCE

(75) Inventors: Brian J. Murphy, Morton, IL (US); Anthony K. Chan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 356 days.

(21) Appl. No.: 13/534,433

(22) Filed: Jun. 27, 2012

(65) Prior Publication Data
US 2014/0000398 A1  Jan. 2, 2014

(51) Int. Cl.
*F16H 55/18* (2006.01)
(52) U.S. Cl.
USPC .......................... 74/409; 74/440; 123/196 R
(58) Field of Classification Search
CPC .................................................. F16H 55/14
USPC .................... 74/409, 431, 440; 123/196 R
See application file for complete search history.

(56) References Cited

U.S. PATENT DOCUMENTS

| | | | |
|---|---|---|---|
| 1,426,173 A | 8/1922 | Fuegel et al. | |
| 2,247,839 A | 7/1941 | Halford et al. | |
| 2,374,344 A | 4/1945 | Gillmore et al. | |
| 2,918,826 A * | 12/1959 | Miller | 74/411 |
| 2,992,532 A | 7/1961 | Miller | |
| 3,109,317 A | 11/1963 | Cousino et al. | |
| 3,224,423 A * | 12/1965 | Ostborg | 123/90.15 |
| 3,407,727 A * | 10/1968 | Fischer | 101/177 |
| 3,460,405 A * | 8/1969 | Simmons | 475/92 |
| 3,502,059 A * | 3/1970 | Davis et al. | 123/90.15 |
| 3,580,011 A * | 5/1971 | Pfarrwaller | 464/62.1 |
| 3,648,534 A * | 3/1972 | Fagarazzi | 74/440 |
| 4,072,064 A * | 2/1978 | Lloyd et al. | 74/409 |
| 4,265,131 A * | 5/1981 | Grover | 74/89.16 |
| 4,532,822 A | 8/1985 | Godlewski | |
| 4,793,200 A | 12/1988 | McDonald | |
| 5,119,687 A * | 6/1992 | Naruoka et al. | 74/490.11 |
| 5,341,701 A | 8/1994 | Krom et al. | |
| 5,540,112 A | 7/1996 | Baker et al. | |
| 5,870,928 A | 2/1999 | Genter et al. | |
| 5,979,259 A * | 11/1999 | Shook et al. | 74/409 |
| 6,109,129 A | 8/2000 | Genter et al. | |
| 6,247,377 B1 * | 6/2001 | Long et al. | 74/440 |
| 6,293,166 B1 * | 9/2001 | Genter et al. | 74/440 |
| 7,658,124 B2 | 2/2010 | Brosowske et al. | |
| 7,748,288 B2 | 7/2010 | Chevalier et al. | |
| 8,197,230 B2 * | 6/2012 | Schell et al. | 417/313 |
| 8,225,689 B2 * | 7/2012 | Brosowske et al. | 74/440 |

(Continued)

FOREIGN PATENT DOCUMENTS

WO      2006056750      6/2006

*Primary Examiner* — David M Fenstermacher
(74) *Attorney, Agent, or Firm* — Baker Hostetler (57) ABSTRACT

A compliant gear assembly includes a hub subassembly including a first hub component defining a first axis and a second hub component movable relative to the first hub component in a controlled direction perpendicular to the first axis. A gear ring, which is rotatably mounted on the hub subassembly and defines a gear ring axis of rotation, is coupled to move with the second hub component between a biased position in which the gear ring axis of rotation is coaxial with the first axis and a translated intermediate stop position in which the gear ring axis of rotation is parallel to but not coaxial with the first axis. A spring component is coupled between the first and second hub components, biases the second hub component toward the biased position, and provides a variable spring force that increases as the second hub component is moved toward the translated intermediate stop position.

20 Claims, 5 Drawing Sheets

(56) References Cited

U.S. PATENT DOCUMENTS 8,677,973 B2 * 3/2014 Petry-Johnson et al. . 123/196 R
2004/0200302 A1 * 10/2004 Kampichler et al. .......... 74/409
2009/0217779 A1 9/2009 Brosowske et al.
2010/0269615 A1 10/2010 Endou et al.

* cited by examiner

COMPLIANT GEAR ASSEMBLY HAVING VARIABLE SPRING FORCE

TECHNICAL FIELD

The present disclosure relates generally to a compliant gear assembly, and more particularly to a compliant gear assembly providing translation of a gear ring relative to a hub component using a spring component having a variable spring force. Damping of the translation movement may also be provided.

BACKGROUND

Gear trains may include a plurality of gears, such as a driving gear, idler gears, and driven gears, used for transferring torque and speed. Gear trains are used in engine applications and, according to a particular engine application, may include a crank gear drivingly coupled with a cam gear through one or more idler gears. The torque and speed transferred from the crank gear to the cam gear may be used for valve opening and closing and for fuel injection. As such, a relatively stiff gear train may be required to maintain proper timing of the cam gear actuated events relative to the engine crank angle. However, dynamic activity of the crank and cam gears during operation of the engine can be substantial and, as a result, may impart significant impulsive torques through the gear train. These impulsive torques may cause gear teeth of adjacent gears to come out of mesh and be rapidly forced back into mesh or cause a backside tooth impact, which can result in excessive noise and can cause premature wear of the gear train components.

Some engineers have sought to address such problems by incorporating dampers, such as pendulum dampers and viscous dampers, into the gear trains. Another approach has been to introduce compliance into the gear train. In general terms, compliant gears provide reduced stiffness, or slack, in the gear train, allowing one or more of the gears to attenuate its response to impulsive loads. Where a particular gear might otherwise be sharply accelerated or decelerated due to a torque impulse, compliance will allow the gear to more gradually adjust its rotation to accommodate the impulsive load. Compliant gears can thus attenuate the impulsive loads, reducing undue wear, mechanical strain, and audible noise.

U.S. Pat. No. 2,992,532 to Miller teaches a control system that uses hydraulic force to actively adjust an idler gear ring axis of rotation. In particular, Miller proposes using a hydraulic system that experiences pressure changes in response to torque fluctuations. As the control system pressure changes, the gear ring axis of rotation is actively shifted. For example, as a result of decreased torque fluctuations over time, the control system pressure decreases to urge the idler gear teeth closer in mesh with the driving gear teeth to reduce occurrences of teeth separation. Thus, Miller teaches a control system for actively shifting a gear ring axis of rotation, rather than a compliant gear system that passively responds to torques exceeding a predetermined threshold. Although various alternatives exist for addressing the negative impacts of dynamic gear train activity, there remains a continuing need for solutions, particularly when previously unrecognized problems are identified.

The present disclosure is directed to one or more of the problems or issues set forth above.

SUMMARY OF THE DISCLOSURE

In one aspect, a compliant gear assembly includes a hub subassembly including a first hub component defining a first axis extending through opposing faces of the first hub component, and a second hub component movable relative to the first hub component in a controlled direction perpendicular to the first axis. A gear ring, which is rotatably mounted on the hub subassembly and defines a gear ring axis of rotation, is coupled to move with the second hub component between a biased position in which the gear ring axis of rotation is coaxial with the first axis and a translated intermediate stop position in which the gear ring axis of rotation is parallel to but not coaxial with the first axis. A spring component is coupled between the first hub component and the second hub component and biases the second hub component toward the biased position. The spring component provides a variable spring force that increases as the second hub component is moved toward the translated intermediate stop position.

In another aspect, an internal combustion engine includes an engine block, a support housing attached to an end of the engine block, and a gear train mounted to the support housing or engine block. The gear train includes a driving gear, a driven gear, and a compliant gear assembly coupled between the driving gear and the driven gear. The compliant gear assembly includes a hub subassembly, a gear ring, and a spring component. The hub subassembly includes a first hub component defining a first axis extending through opposing faces of the first hub component, and a second hub component movable relative to the first hub component in a controlled direction perpendicular to the first axis. The gear ring, which is rotatably mounted on the hub subassembly and defines a gear ring axis of rotation, is coupled to move with the second hub component between a biased position in which the gear ring axis of rotation is coaxial with the first axis and a translated intermediate stop position in which the gear ring axis of rotation is parallel to but not coaxial with the first axis. The spring component is coupled between the first hub component and the second hub component, biases the second hub component toward the biased position, and provides a variable spring force that increases as the second hub component is moved toward the translated intermediate stop position.

In yet another aspect, a method of transferring torque using a gear train including a compliant gear assembly is provided. The compliant gear assembly includes a hub subassembly, a gear ring, and a spring component. The hub subassembly includes a first hub component defining a first axis extending through opposing faces of the first hub component, and a second hub component movable relative to the first hub component in a controlled direction perpendicular to the first axis. The gear ring, which is rotatably mounted on the hub subassembly and defines a gear ring axis of rotation, is coupled to move with the second hub component between a biased position in which the gear ring axis of rotation is coaxial with the first axis and a translated intermediate stop position in which the gear ring axis of rotation is parallel to but not coaxial with the first axis. The spring component is coupled between the first hub component and the second hub component, biases the second hub component toward the biased position, and provides a variable spring force that increases as the second hub component is moved toward the translated intermediate stop position. The method includes steps of maintaining the biased position of the second hub component using an initial preload force of the spring component, and transferring a first torque from a driving gear to a driven gear using the compliant gear assembly while the second hub component is in the biased position. The method also includes delivering a second torque that is greater than the first torque to the compliant gear assembly, and moving the second hub component to the translated intermediate stop position by overcoming the initial preload force of the spring component with the second torque.

Movement of the second hub component is restricted beyond the translated intermediate stop position using an increased spring force of the spring component that is greater than the initial preload force. As such, transfer of the second torque from the input gear to the output gear is limited using the compliant gear assembly while the second hub component is in the translated intermediate stop position.

DETAILED DESCRIPTION

Figure 1:
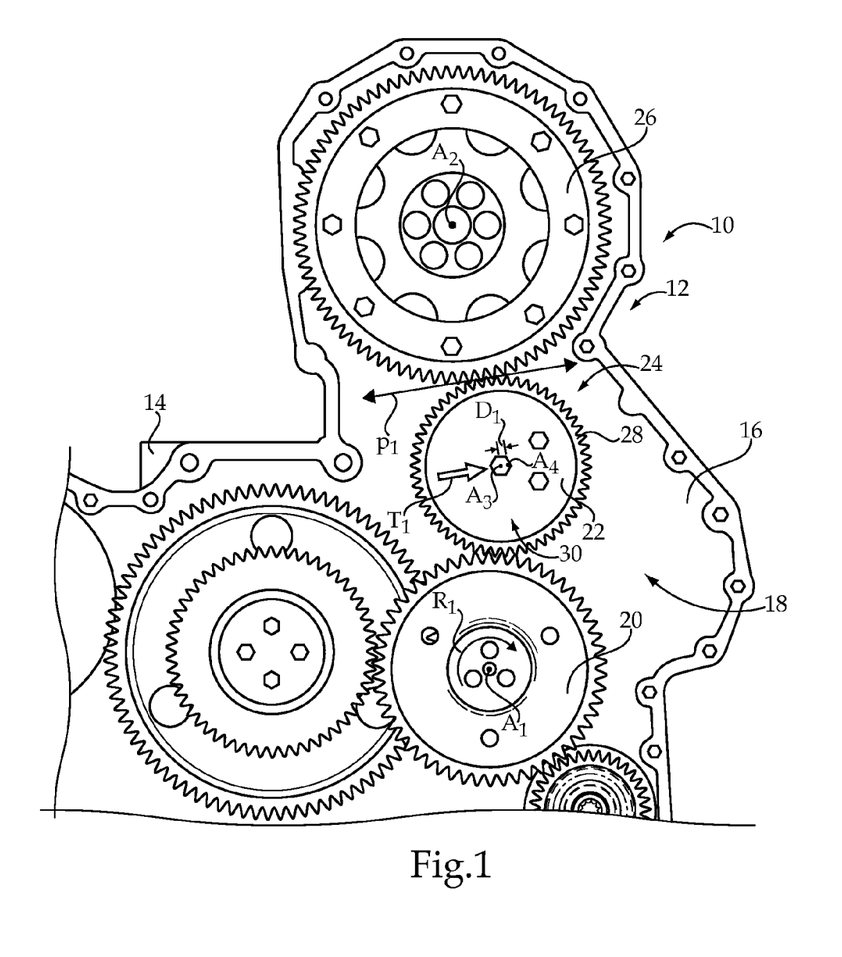
FIG. 1 is a schematic illustration of an engine system including a gear train, according to the present disclosure.

Referring to FIG. 1, there is shown a schematic view of an engine system 10, according to the present disclosure. The engine system 10 may include an internal combustion engine 12, which, for purposes of illustration, and not limitation, may be that of a four-stroke, compression ignition engine and may include an engine block 14 defining a plurality of combustion chambers or cylinders (not shown). The internal combustion engine 12 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.).

Internal combustion engine 12 may include an engine housing 16 and a gear train 18 mounted to the engine housing 16 or engine block 14. The gear train 18 may include a driving gear 20, defining a driving gear axis of rotation $A_1$ and having a rotation direction indicated by way of arrow $R_1$. An idler gear 22, which may also be referred to as a compliant gear assembly 24, may be coupled with and in mesh with the driving gear 20. A driven gear 26 may be in mesh with the compliant gear assembly 24 and may have a driven gear axis of rotation $A_2$. The compliant gear assembly 24 may include a gear ring 28 rotatable about a hub subassembly 30, and may have a gear ring axis of rotation $A_3$ that is movable in a controlled translation direction noted by arrow $T_1$ responsive to particular torque applications, as will be described in greater detail herein. In particular, the gear ring axis of rotation $A_3$ may be movable in a direction perpendicular to the rotation axis $A_3$ across a distance $D_1$ toward a position shown at $A_4$. As shown, the controlled translation direction $T_1$ may be substantially parallel to a line $P_1$ that is tangent to the pitch circles of both the compliant gear assembly 24 and the driven gear 26.

Figure 2:
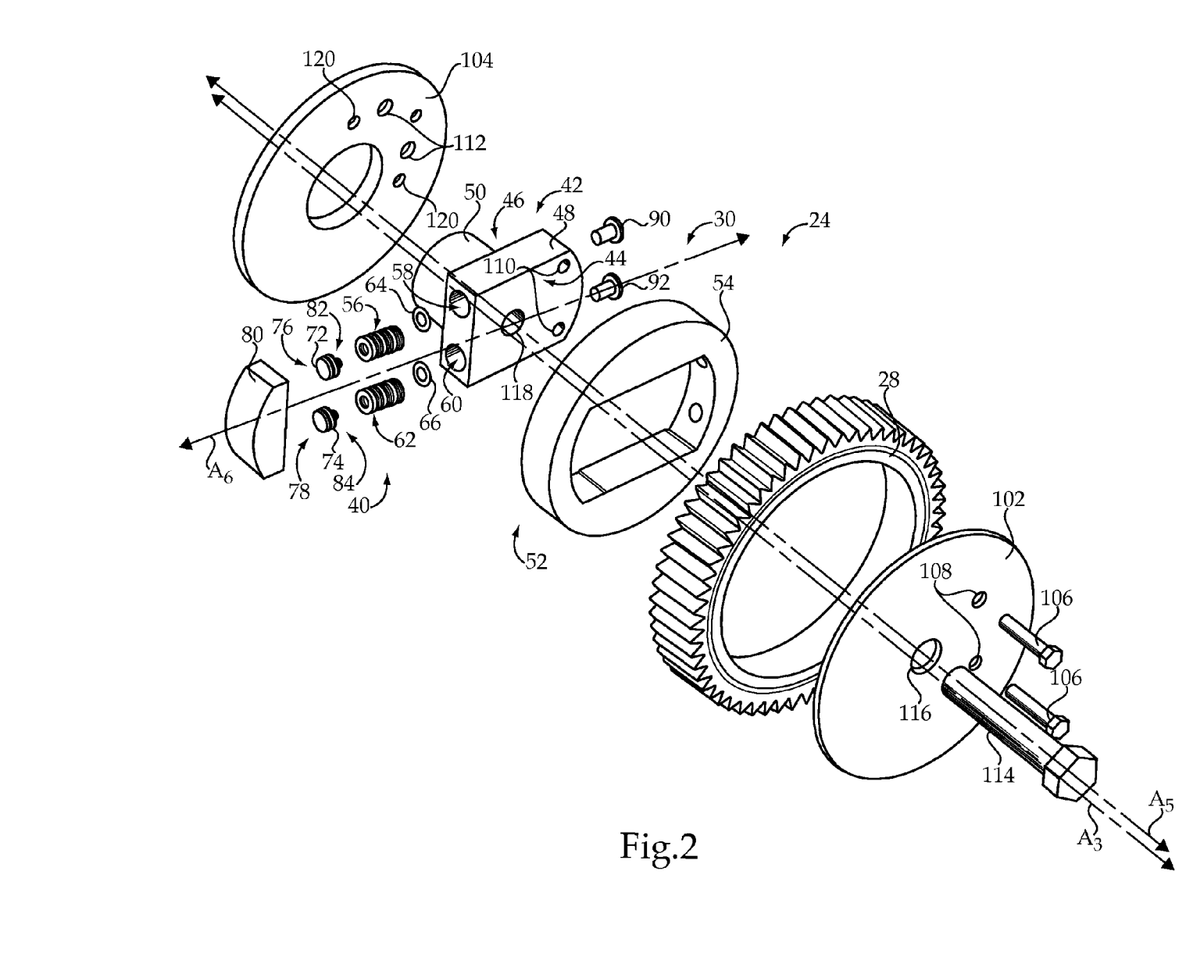
FIG. 2 is an exploded view of the compliant gear assembly of the gear train of FIG. 1, according to one embodiment of the present disclosure.

Turning now to FIG. 2, an exemplary embodiment of the compliant gear assembly 24 will be discussed. The compliant gear assembly 24 may generally include the hub subassembly 30, the gear ring 28, and a spring component 40. The hub subassembly 30 may include a first hub component 42 defining a first axis $A_5$ extending through opposing faces 44 and 46 of the first hub component 42. In particular, the first hub component 42 may include a stubshaft 48 adapted for mounting the compliant gear assembly 24 to the engine housing 16, which may also generally be referred to as a support housing, either directly or indirectly. For example, the stubshaft 48 may include a mounting projection 50, such as a cylindrical mounting projection, for securing a stationary position of the stubshaft 48 relative to the support housing 16. Alternatively, the stubshaft 48 may be supported on an independent mounting structure, which is secured to the engine housing 16 or engine block 14.

The hub subassembly 30 may also include a second hub component 52, which, as will be described in greater detail below, is movable relative to the first hub component 42, or stubshaft 48, in a controlled direction perpendicular to the first axis $A_5$. Referring back to FIG. 1, the second hub component 52 may be movable in the direction indicated by arrow $T_1$. Returning to FIG. 2, the second hub component 52 may include a circular gear body 54, with the gear ring 28 being rotatable relative to the circular gear body 54 and, thus, movable with the second hub component 52. For example, the gear ring 28 may be mounted to the hub subassembly 30 using a bushing or other similar component.

Figure 3:
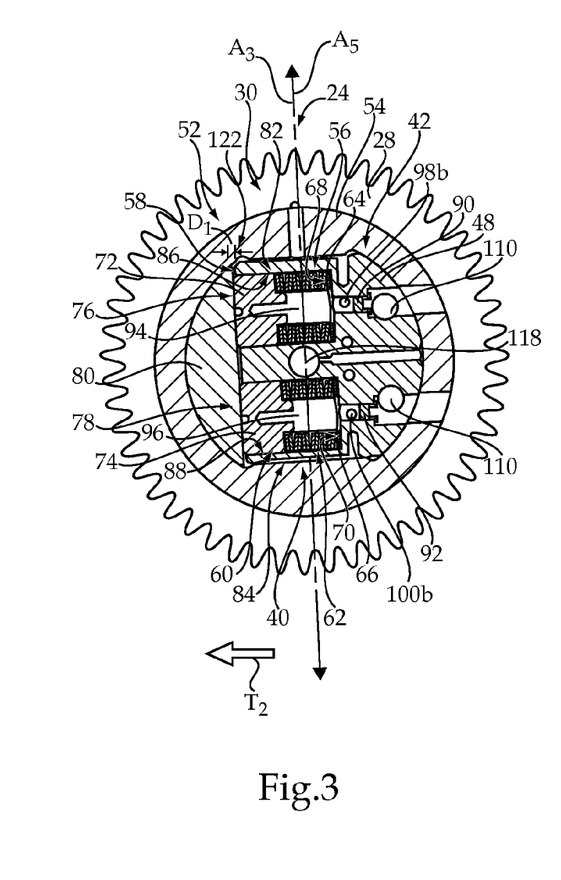
FIG. 3 is a sectioned view of the compliant gear assembly of FIG. 2, shown in a biased position.

Referring also to FIG. 3, the spring component 40 may be coupled between the first hub component 42 and the second hub component 52. In particular, the spring component 40, which may be a non-coil spring component, may include a first stack of coned-disc springs 56, such as Belleville springs or washers, received within a first spring bore 58 of the stubshaft 48. According to the exemplary embodiment, the stubshaft 48 may also define a second spring bore 60 receiving a second stack of coned-disc springs 62, with both of the first and second spring bores 58 and 60 being oriented along an axis $A_6$ perpendicular to the first axis $A_5$. Respective spacers 64 and 66 may be positioned between end walls 68 and 70 of the spring bores 58 and 60 and the first and second stacks of coned-disc springs 56 and 62. Pistons 72 and 74 may also be movable within respective spring bores 58 and 60 and may have first ends 76 and 78 contacting a slide 80 and second ends 82 and 84 contacting the respective one of the stacks of coned-disc springs 56 and 62. As will be explained below in greater detail, the slide 80 may be coupled between the first hub component 42 and the second hub component 52 and may be configured to transmit a biasing force of the spring component 40, which may include stacks of coned-disc springs 56 and 62, to the second hub component 52.

Figure 5:
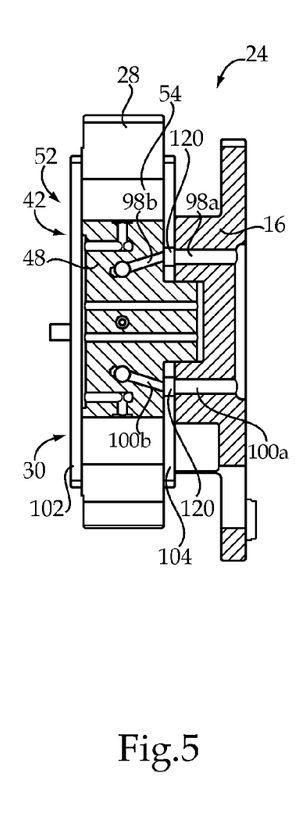
FIG. 5 is a sectioned view of the compliant gear assembly of FIG. 2, illustrating damping fluid supply channels, according to one aspect of the present disclosure.

The pistons 72 and 74, together with the end walls 68 and 70, side walls 86 and 88 defining the spring bores 58 and 60, and plugs 90 and 92, may define fluid chambers 94 and 96, which may contain a damping fluid for damping movements of the second hub component 52. For example, and with reference to FIG. 5, the engine block 14 may define a plurality of fluid galleries (not shown) supplying a damping fluid along fluid supply lines 98a and 100a provided in the support housing 16, or other mounting structure, which fluidly connect with fluid supply lines 98b and 100b provided in the stubshaft 48. The fluid supply lines 98b and 100b may ultimately open in respective fluid chambers 94 and 96. While check valves (not shown) positioned along the supply lines 98a and 100a or 98b and 100b may provide a controlled supply of damping fluid into the fluid chambers 94 and 96, a diametrical clearance between the pistons 72 and 74 and the respective spring bores 58 and 60 may provide the only exit route for the damping fluid from the fluid chambers 94 and 96. In particular, the diametrical clearance may provide controlled leaking of the damping fluid from the fluid chambers 94 and 96. As should be appreciated, the diametrical clearance may be selected to provide a desired damping effect. According to a particular embodiment, approximately 60 microns of diametrical clearance may be provided. However, it should be appreciated that the amount of controlled leaking, which may alternatively be provided using orifices or other known means, may be selected to provide a desired damping for the particular application.

Returning to FIG. 2, a cover plate 102 may be provided, which may be positioned at a first axial side of gear ring 28 and hub subassembly 30, and a backing plate 104, which may be positioned at a second axial side of gear ring 28 and hub subassembly 30, may also be provided. According to the exemplary embodiment, a set of bolts 106 may be provided, which are passed through openings 108 formed in the cover plate 102, openings 110 formed in the stubshaft 48, and openings 112 formed in the backing plate 104. A center bolt 114 may be received through a center opening 116 through the cover plate 102 and a center opening 118 of the stubshaft 48. The center bolt 114 may extend through the mounting projection 50 of the stubshaft 28 and may be secured within a mounting bore (not shown) formed in the support housing 16 to mount the compliant gear assembly 24 to the internal combustion engine 12. When properly assembled and mounted, openings 120 through backing plate 104 fluidly connect fluid supply lines 98a and 100a with fluid supply lines 98b and 100b. Although not discussed herein in detail, lubrication supply lines may also be provided for supplying lubricating oil to certain components of the compliant gear assembly 24.

As stated above, the slide 80 may transmit a combined biasing force of the first and second stacks of coned-disc springs 56 and 62 to the second hub component 52. In particular, and as shown in FIG. 3, the stacks of coned-disc springs 56 and 62 may, through contact with the pistons 72 and 74 and slide 80, bias the circular gear body 54 and, thus, gear ring 28 toward a biased position in which the gear ring axis of rotation $A_3$ is coaxial with the first axis $A_5$. In the biased position, the pistons 72 and 74, slide 80, circular gear body 54, and gear ring 28 are urged in a direction indicated by arrow $T_2$, and a clearance or gap between the slide 80 and stubshaft 48, shown generally at 122, may be provided. The clearance or gap 122 may correspond to the translation distance $D_1$ described above and may be selected based on a desired stiffness of the gear train 18. For example, according to some embodiments, a deflection of less than one millimeter may be desired.

Figure 4:
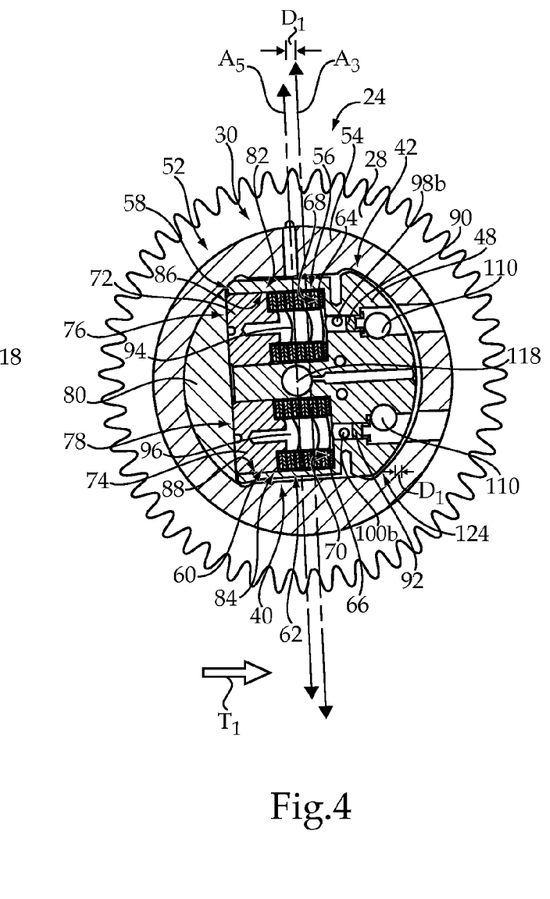
FIG. 4 is a sectioned view of the compliant gear assembly of FIG. 2, shown in a stop position.

In response to torque loads overcoming the biasing force of the first and second stacks of coned-disc springs 56 and 62, the second hub component 52 may be moved from the biased position of FIG. 3 toward a hard stop position, as shown in FIG. 4. In particular, a torque load greater than the biasing force, or preload force, of the stacks of coned-disc springs 56 and 62 may urge the gear ring 28, circular gear body 54, slide 80, and pistons 72 and 74 in the translation direction noted by arrow $T_1$. This movement, if sufficient to overcome the biasing force, will compress, or deflect, the stacks of coned-disc springs 56 and 62 and move the gear ring axis of rotation $A_3$ in the direction noted by arrow $T_1$. As a result the gear ring axis of rotation $A_3$ may be translated through a plurality of translated stop positions such that it is parallel to but not coaxial with the first axis $A_5$, and a clearance or gap 124 between the stubshaft 48 and circular gear body 54, on the side of the stubshaft 48 opposite the slide 80, may be provided.

In addition, damping fluid may dissipate the torque spike (i.e., the impulsive torque greater than the biasing force) by absorbing the energy and releasing it as heat. As should be appreciated, the second hub component 52 may be movable through an infinite range of translated intermediate stop positions between the biased position and the hard stop position. According to the hard stop position, the clearance or gap 124 and the distance between the gear ring axis of rotation $A_3$ and the first axis $A_5$ may correspond to the translation distance $D_1$. According to some embodiments, contact between the slide 80 and the stubshaft 48 may prevent a complete deflection of the spring component 40.

Figure 6:
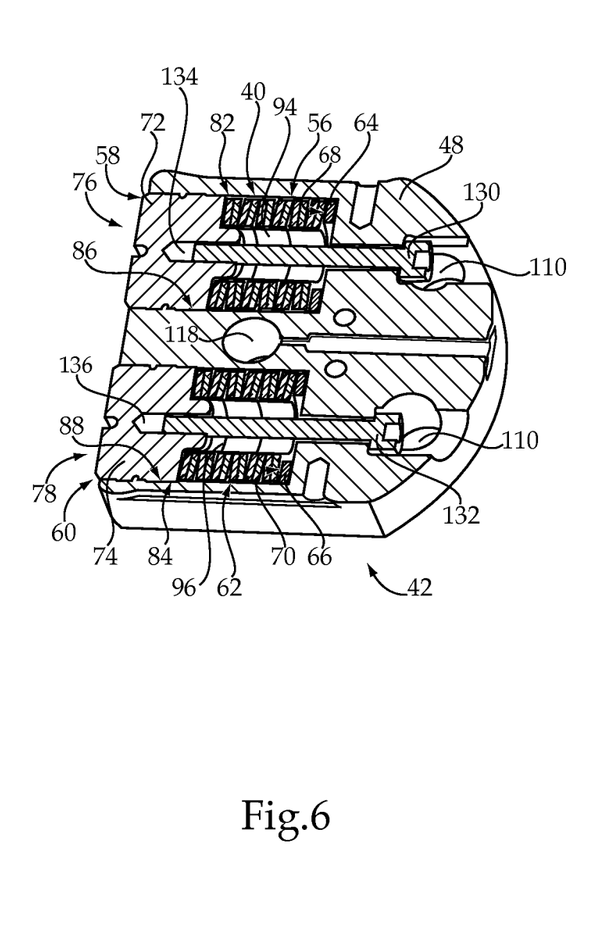
FIG. 6 is a sectioned view of the compliant gear assembly of FIG. 2, at one stage of an assembly process, according to another aspect of the present disclosure.
Figure 7:
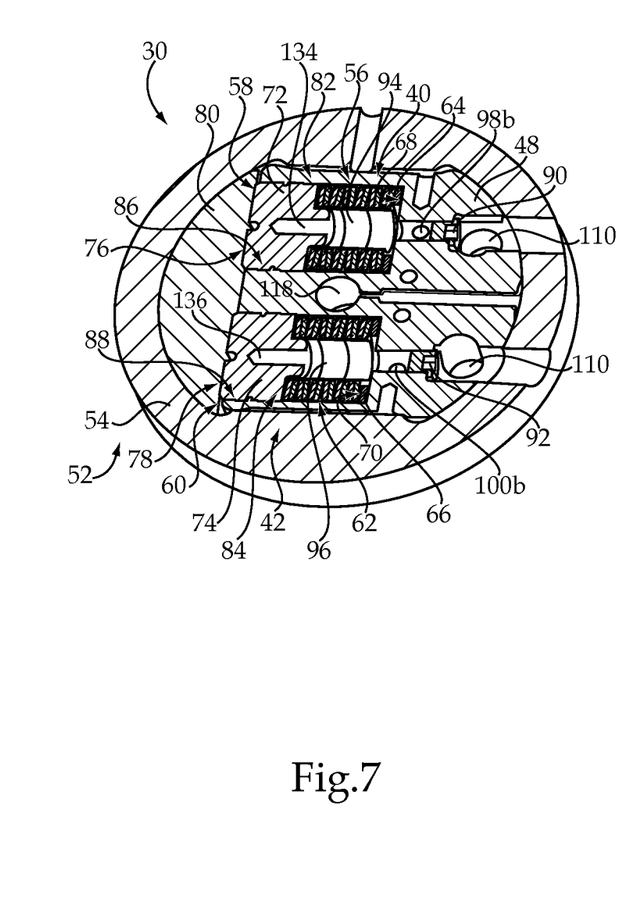
FIG. 7 is a sectioned view of the compliant gear assembly of FIG. 2, at another stage of the assembly process, according to another aspect of the present disclosure.

Turning now to FIG. 6, a stage in an exemplary assembly process is shown. In particular, fasteners 130 and 132 may be used during assembly of the compliant gear assembly 24 to hold the first and second stacks of coned-disc springs 56 and 62 in a desired state of deflection. As shown, the fasteners 130 and 132 may be received within threaded bores 134 and 136 of respective pistons 72 and 74 such that fasteners 130 and 132 may be rotated in one direction to increase compression of the stacks of springs 56 and 62 with the pistons 72 and 74 and rotated in another direction to decrease compression of the stacks of springs 56 and 62. After the stubshaft 48 is assembled with the circular gear body 54 and slide 80, the fasteners 130 and 132 may be removed and the plugs 90 and 92 may be inserted, as shown in FIG. 7. However, the fasteners 130 and 132 may be eliminated if the pistons 72 and 74 are compressed using alternative means during assembly.

The first and second stacks of coned-disc springs 56 and 62 may be selected and arranged to provide a desired variable spring force. As shown, each of the stacks 56 and 62 may include twelve individual coned-disc springs, such as Belleville washers or springs, shown in a series-parallel configuration. However, it should be appreciated that alternative arrangements of coned-disc springs, or alternative components providing a variable spring force, including rubber components, may be used. Further, although two stacks of coned-disc springs are shown, any number of components or stacks may be used.

Figure 8:
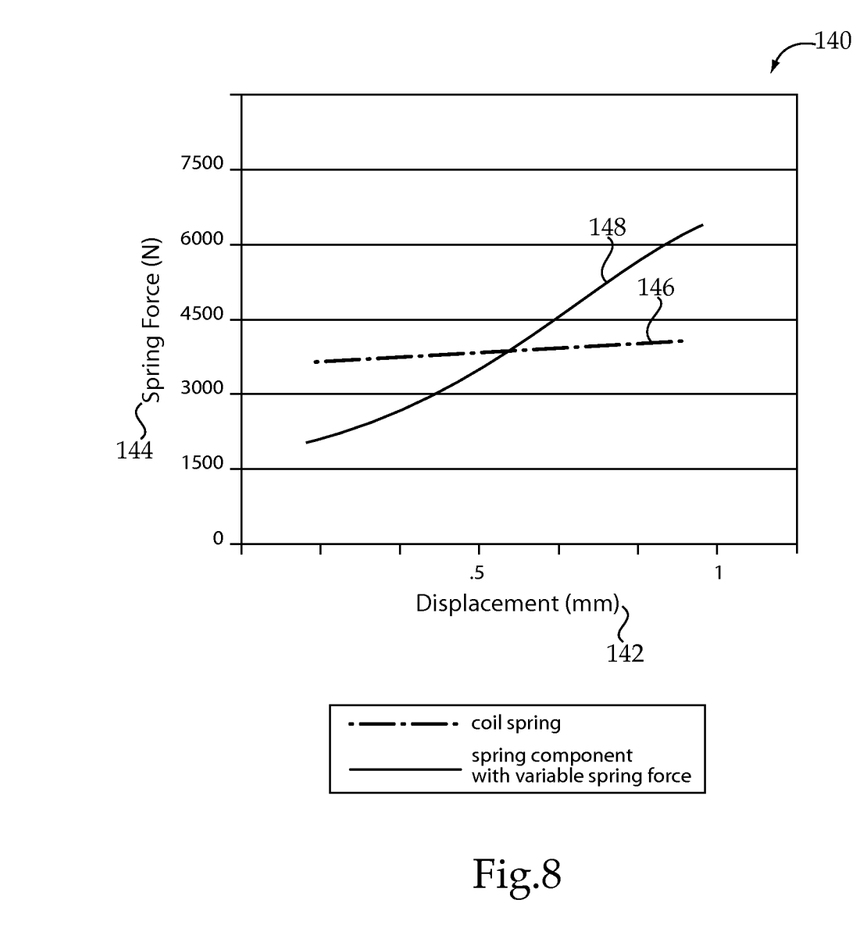
FIG. 8 is a graph of spring force versus displacement depicting a variable spring force of the compliant gear assembly of FIG. 2, according to another aspect of the present disclosure.

Turning now to a graph 140 of FIG. 8, an exemplary variable spring force provided by the stacks of coned-disc springs 56 and 62 is shown. In particular, graph 140 depicts displacement (also referenced throughout as compression or deflection) 142, in millimeters, versus spring force 144, in Newtons. While a coil spring may provide a linear or constant spring rate (i.e., only a slight or nominal increase in spring force is provided, particularly over a relatively short displacement), as shown at 146, the spring component 40, which may be something other than a coil spring or nested coil spring, of the compliant gear assembly 24 disclosed herein may provide a variable spring force 148. The variable spring force 148, as provided by the stacks of coned-disc springs 56 and 62 described herein, provides a significant increase in force over the relatively short displacement distance. In particular, the variable spring force 148 may be set to an initial preload force, such as, for example, 2000 Newtons, that increases toward 6500 Newtons as the spring component 40, which may include the stacks of coned-disc springs 56 and 62, is compressed toward a one millimeter deflection distance, which may correspond to distance $D_1$. Thus, according to some embodiments, the force required to deflect the spring component 40 may more than double as the second hub component 52 is moved from the biased position of FIG. 3 toward the hard stop position of FIG. 4.

INDUSTRIAL APPLICABILITY

The present disclosure finds potential application in any machine and/or engine utilizing a gear train to transfer torque and speed. Further, the present disclosure is applicable to gear trains including idler gears, which are subject to impulsive torque loads from the driving and/or driven gears with which the idler gears are in mesh. Yet further, the present disclosure is applicable to a compliant gear assembly that may be coupled between driving and driven gears to attenuate impulsive torque loads over a relatively broad range of speeds and loads.

Referring generally to FIGS. 1-8, an internal combustion engine 12 may include an engine housing 16 and a gear train 18 mounted to the engine housing 16 or engine block 14. The gear train 18 may include a compliant gear assembly 24 in mesh with a driving gear 20 and a driven gear 26 to transfer a torque from the driving gear 20 to the driven gear 26. The compliant gear assembly 24 may generally include a hub subassembly 30 including a first hub component 42 defining a first axis $A_5$ and a second hub component 52, which is movable relative to the first hub component 42 in a controlled translation direction $T_1$ perpendicular to the first axis $A_5$. A gear ring 28 is rotatable about the hub subassembly 30 and movable with the second hub component 52. A spring component 40, which may include first and second stacks of coned-disc springs 56 and 62, is coupled between the first and second hub components 42 and 52 and biases the second hub component 52 toward a biased position. According to the biased position, as shown in FIG. 3, a gear ring axis of rotation $A_3$ is coaxial with the first axis $A_5$.

The biased position of the second hub component 52 may be maintained using an initial preload force of the spring component 40. A first torque, which may represent a mean torque and may be insufficient to overcome the preload force of the spring component 40, may be transferred from the driving gear 20 to the driven gear 26 using the compliant gear assembly 24 while the second hub component 52 is in the biased position. However, in response to a second torque, which may represent an impulsive torque load that is greater than the first torque, being delivered to the compliant gear assembly 24, the second hub component 52 may be moved toward a hard stop position, as shown in FIG. 4, by overcoming the initial preload force of the spring component 40 with the second torque. Damping of this movement of the second hub component 52 may be provided using pistons 72 and 74, the damping fluid provided in fluid chambers 94 and 96, and a controlled leakage, which may be provided through a diametrical clearance between the pistons 72 and 74 and the respective spring bores 58 and 60.

According to the hard stop position and the range of translated intermediate stop positions between the biased position and the hard stop position, the gear ring axis of rotation $A_3$ may be translated such that it is parallel to but not coaxial with the first axis $A_5$. Movement of the second hub component 52 beyond any of the translated intermediate stop positions may be restricted using an increased spring force of the spring component 40 that is greater than the initial preload force. For example, the second torque may be sufficient to overcome the initial preload force, but insufficient to overcome the increasing spring force at a greater displacement. As such, transfer of the second torque from the driving gear 20 to the driven gear 26 may be limited using the compliant gear assembly 24 while the second hub component 52 is in the translated intermediate stop position.

The compliant gear assembly disclosed herein provides a means for reducing impulsive torques or torque spikes that are imparted through a gear train. In particular, the compliant gear assembly may be translated to attenuate its response to impulsive torque loads and, thus, reduce the excessive noise and wear that may otherwise occur. According to some embodiments, the compliant gear assembly may provide a 1-6 decibels engine sound power reduction. These advantages are provided over a broader range of torques and speed than conventional compliant gears. In particular, the compliant gear assembly of the present disclosure incorporates a spring component having a reduced preload force, compared to conventional designs, that increases significantly as the spring component is compressed to address, or respond to, a broad range of torques and speeds. In addition, the torque spikes may be absorbed and converted to heat using damping fluid provided in the spring chambers. Conventional designs utilizing coil springs, on the other hand, absorb the torque spikes and ultimately release the energy back into the gear train.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A compliant gear assembly, comprising:
   a hub subassembly including a first hub component defining a first axis extending through opposing faces of the first hub component, and a second hub component movable relative to the first hub component in a controlled direction perpendicular to the first axis;
   a gear ring rotatably mounted on the hub subassembly and defining a gear ring axis of rotation, wherein the gear ring is coupled to move with the second hub component between a biased position in which the gear ring axis of rotation is coaxial with the first axis and a translated intermediate stop position in which the gear ring axis of rotation is parallel to but not coaxial with the first axis; and
   a spring component coupled between the first hub component and the second hub component and biasing the second hub component toward the biased position, wherein the spring component provides a variable spring force that increases as the second hub component is moved toward the translated intermediate stop position.

2. The compliant gear assembly of claim 1, further including a fluid chamber containing a damping fluid surrounding the spring component and a movable component for compressing the damping fluid for damping movement of the second hub component.

3. The compliant gear assembly of claim 2, wherein the variable spring force doubles as the second hub component is moved from the biased position toward a hard stop position.

4. The compliant gear assembly of claim 1, wherein the first hub component includes a stubshaft adapted for mounting the compliant gear assembly to a support housing.

5. The compliant gear assembly of claim 4, wherein the second hub component includes a circular gear body, wherein the gear ring is rotatable relative to the circular gear body.

6. The compliant gear assembly of claim 5, further including a slide coupled between the first hub component and the second hub component and configured to transmit a biasing force of the spring component to the second hub component.

7. The compliant gear assembly of claim 6, wherein the spring component includes a first stack of coned-disc springs arranged to provide the variable spring force.

8. The compliant gear assembly of claim 7, wherein the stubshaft defines a first spring bore oriented along an axis perpendicular to the first axis and receiving the first stack of coned-disc springs, wherein the compliant gear assembly further includes a piston movable within the first spring bore and having a first end contacting the slide and having a second end contacting the first stack of coned-disc springs.

9. The compliant gear assembly of claim 8, further including a damping fluid contained within a fluid chamber defined within the first spring bore and surrounding the first stack of coned-disc springs.

10. The compliant gear assembly of claim 8, wherein the stubshaft defines a second spring bore parallel with the first spring bore and receiving a second stack of coned-disc springs, wherein the first stack of coned-disc springs and the second stack of coned-disc springs together define the variable spring force.

11. An internal combustion engine, comprising:
an engine block;
a support housing attached to an end of the engine block; and
a gear train mounted to the support housing or the engine block and including a driving gear, a driven gear, and a compliant gear assembly coupled between the driving gear and the driven gear;
wherein the compliant gear assembly includes:
a hub subassembly including a first hub component defining a first axis extending through opposing faces of the first hub component, and a second hub component movable relative to the first hub component in a controlled direction perpendicular to the first axis;
a gear ring rotatably mounted on the hub subassembly and defining a gear ring axis of rotation, wherein the gear ring is coupled to move with the second hub component between a biased position in which the gear ring axis of rotation is coaxial with the first axis and a translated intermediate stop position in which the gear ring axis of rotation is parallel to but not coaxial with the first axis; and
a spring component coupled between the first hub component and the second hub component and biasing the second hub component toward the biased position, wherein the spring component provides a variable spring force that increases as the second hub component is moved toward the translated intermediate stop position.

12. The internal combustion engine of claim 11, wherein the compliant gear assembly further includes a fluid chamber containing a damping fluid surrounding the spring component and a movable component for compressing the damping fluid for damping movement of the second hub component.

13. The internal combustion engine of claim 11, wherein the controlled direction is substantially parallel to a line that is tangent to pitch circles of both the compliant gear assembly and the driven gear.

14. The internal combustion engine of claim 11, wherein the first hub component includes a stubshaft adapted for mounting the compliant gear assembly to the support housing.

15. The internal combustion engine of claim 14, wherein the second hub component includes a circular gear body, wherein the gear ring is rotatable relative to the circular gear body.

16. The internal combustion engine of claim 15, wherein the spring component includes a first stack of coned-disc springs and a second stack of coned-disc springs configured to transmit a biasing force to the second hub component, wherein the first stack of coned-disc springs and the second stack of coned-disc springs are parallel with one another and perpendicular to the first axis.

17. A method of transferring torque using a gear train including a compliant gear assembly, wherein the compliant gear assembly includes a hub subassembly which includes a first hub component defining a first axis extending through opposing faces of the first hub component and a second hub component movable relative to the first hub component in a controlled direction perpendicular to the first axis, wherein the compliant gear assembly further includes a gear ring rotatably mounted on the hub subassembly and defining a gear ring axis of rotation, wherein the gear ring is coupled to move with the second hub component between a biased position in which the gear ring axis of rotation is coaxial with the first axis and a translated intermediate stop position in which the gear ring axis of rotation is parallel to but not coaxial with the first axis, wherein the compliant gear assembly also includes a spring component coupled between the first hub component and the second hub component and providing a variable spring force, the method comprising steps of:
maintaining the biased position of the second hub component using an initial preload force of the spring component;
transferring a first torque from a driving gear to a driven gear using the compliant gear assembly while the second hub component is in the biased position;
delivering a second torque that is greater than the first torque to the compliant gear assembly;
moving the second hub component to the translated intermediate stop position by overcoming the initial preload force of the spring component with the second torque;
restricting movement of the second hub component beyond the translated intermediate stop position using an increased spring force of the spring component that is greater than the initial preload force; and
limiting transfer of the second torque from the driving gear to the driven gear using the compliant gear assembly while the second hub component is in the translated intermediate stop position.

18. The method of claim 17, further including damping movement of the second hub component using a damping fluid.

19. The method of claim 18, further including doubling a force required to deflect the spring component as the second hub component is moved from the biased position toward a hard stop position.

20. The method of claim 19, further including providing the variable spring force using at least one stack of coned-disc springs.

* * * * *